Patented Aug. 26, 1930

1,773,923

UNITED STATES PATENT OFFICE

WILLIAM MENDEL, OF BEVERLY, NEW JERSEY, ASSIGNOR TO SAMUEL A. NEIDICH, OF EDGEWATER PARK, NEW JERSEY

VISCOSE COMPLEX

No Drawing.     Application filed May 23, 1925. Serial No. 32,452.

Conversion of liquid viscose (cellulose sulphocarbonate) to coagulated or precipitated cellulose hydrate for the production of filaments and films, by various methods and means, is well known. For instance, such conversion may be effected by progressively projecting a stream of viscose into an aqueous solution containing a suitable acid, or acid salt, either with or without neutral salts or dehydrators, or both, or by the mere action of heat, without the employment of such chemicals. However, an essential step in all such processes is what is termed the "aging" of the viscose to the desired degree of maturity, manifested by such polymerization of the molecule as to permit it to be more easily disorganized in the coagulating medium, and with the so-called normal viscose containing $C_6H_{10}O_5$ to the amount of seven per cent, the time which is required for the viscose to attain the desired degree of maturity aforesaid is not only an important factor in the cost of production of the ultimate filament or film product, but also in the capacity for production thereof by any apparatus.

Therefore, the principal purpose and effect of my invention herein contemplated is to so initially modify the viscose complex that formation of insoluble sulphur complexes is prevented although the desired aging may be accelerated to any desired degree, to thus increase the capacity for production of any suitable apparatus and lessen the cost of the product aforesaid.

The aforesaid conversion of viscose by coagulation and ultimate solidification by the usual means above indicated, is attended by liberation of sulphur and its derivatives, some of which are insoluble and adherent to the product to the detriment of the latter, as they detract from all of the qualities which make such filaments and films commercially valuable, especially their luster, strength and elasticity.

During an extended research for means to effectively remove sulphur and its derivatives from the precipitated cellulose hydrate, I discovered that the action of tri-sodium phosphate ($Na_3PO_4$) upon the cellulose hydrate removes all of such deleterious matter and the use of that chemical for that purpose at different stages in the conversion of viscose to solid form is the subject matter of several of my applications for Letters Patent of the United States copending herewith, for instance, Serial No. 26,825 pursuant to which Letters Patent No. 1,576,529 were granted March 16, 1926. However, during that research, I also discovered that if the $PO_4$ ion be added to, or formed in the viscose, preliminary to or during the aforesaid aging stage thereof, the latter is facilitated in accordance with the amount of said $PO_4$ ion present in the viscose complex, and the matured viscose is much more stable. For instance, although normal viscose ages slower, to the aforesaid mature state; it continues to change thereafter and, within a few hours, passes to a state of over-matured worthlessness; whereas, although my improved viscose reaches such maturity quicker, it thereafter remains stable and without apparent further change for months; provided it is maintained at a temperature of less than 18° C. In other words, by the addition of $PO_4$ ion to the normal viscose, the time and consequent cost of production of properly matured viscose, and of the ultimate products aforesaid may be very materially lessened and the capacity of any given apparatus for such production correspondingly increased, without any alteration in such apparatus. Moreover, the aforesaid stability of my improved viscose avoids the difficulties heretofore experienced in maintaining an adequate supply of spinnable viscose from normal viscose.

For instance, viscose may be prepared by first treating suitable wood pulp or cotton having the typical formula $C_6H_{10}O_5$ by steeping it in an aqueous solution of caustic soda of suitable strength; for instance, containing approximately twenty per cent NaOH. Then pressing the mass to about three times the weight of the dry cellulose; then grinding such pressed material, as fine as possible, and allowing it to stand for about 50 hours. The mass is then subjected to the action of carbon bisulphide ($CS_2$) conveniently during agitation of the mass, until the xanthate is formed, thus;

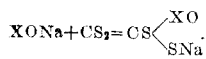

The xanthate is then dissolved in aqueous solution, with or without caustic soda, to which has been added the desired amount of $PO_4$ ion, in the form of $Na_3PO_4$ or otherwise, in accordance with the cellulose content and alkalinity of the xanthate.

I find it convenient to add the desired proportion of tri-sodium phosphate in aqueous solution to the viscose complex thus formed when the latter is in a substantially homogeneous liquid stage. However, said phosphate may be added to the viscose complex at an earlier or later stage, with the effect of more or less accelerating the aging of the viscose complex to the desired degree of maturity aforesaid in accordance with the amount of $PO_4$ included in the viscose complex. However, I find that, in the apparatus with which I have experimented, for formation of thick wide films, the proportion of phosphate may be four and one-half per cent of the cellulose content of the viscose and yet allow time enough for said aging stage, to permit proper disposal of the viscose for subsequent treatment. That is to say, as a matter of expediency, the proportion of tri-sodium phosphate added to the viscose complex must be small enough to permit the removal of the viscose for subsequent use before it has so aged as to pass the desired degree of maturity. For instance, if the viscose is desired for precipitation in the form of thick filaments, upon plates or other carriers; it may be allowed to become more mature than if it is to be spun in minute filaments. However, the precise proportion of the phosphate for any desired rate of aging of the viscose may be readily determined by actual trial and should be limited as aforesaid by the facility with which the viscose may be handled; so as to maintain the maximum efficiency of production of any given apparatus. However, the improvement in quality of the products formed is apparently effected regardless of the amount of $PO_4$ ion present, which may be a fraction of one per cent.

Of course, as above noted, the inclusion of $PO_4$ ion in the viscose minimizes the production of deleterious sulphur compounds therein and, during the subsequent reversion of the viscose to solid form, the effect of such ions is to render the sulphur derivatives soluble so that they may be readily rinsed from the coagulated cellulose hydrate.

Therefore, although I have described a typical embodiment of my invention; I do not desire to limit myself to the specific details of procedure herein set forth, as it is obvious that various modifications may be made therein, without departing from the essential features of my invention, as defined in the appended claims.

I claim:

1. A viscose (cellulose sulphocarbonate) complex including normal viscose in association with less than five per cent tri-sodium phosphate ($Na_3PO_4$) in such proportion as to accelerate the progressive increment of maturity of the normal viscose.

2. A viscose (cellulose sulphocarbonate) complex including normal viscose in association with tri-sodium phosphate ($Na_3PO_4$) in such proportion as to accelerate the progressive increment of maturity of the normal viscose, said proportion being from a fraction of one per cent, to four and one-half per cent, of the cellulose content of the viscose.

3. Viscose mixed with tri-sodium phosphate ($Na_3PO_4$) in such proportion as to accelerate the progressive increment of maturity of the viscose, said proportion being from a fraction of one per cent, to four and one-half per cent, of the cellulose content of the viscose.

4. A liquid cellulose sulphocarbonate complex including tri-sodium phosphate.

5. A liquid alkali cellulose complex including tri-sodium phosphate in such proportion as to accelerate the aging of such cellulose, said proportion being from a fraction of one per cent, to four and one-half per cent, of the cellulose content of the complex.

6. The method of accelerating the increment of maturity of normal viscose, which consists in adding tri-sodium phosphate to such viscose.

In testimony whereof, I have hereunto signed my name at Burlington, New Jersey, this 20th day of May, 1925.

WILLIAM MENDEL.

CERTIFICATE OF CORRECTION.

Patent No. 1,773,923.  Granted August 26, 1930, to

WILLIAM MENDEL.

It is hereby certified that error appears in the printed specification of the above numbered patent requiring correction as follows: Page 2, line 19, following the word and period "xanthate." insert the words "Satisfactory results may be obtained with less than five per cent of said phosphate."; and that the said Letters Patent should be read with this correction therein that the same may conform to the record of the case in the Patent Office.

Signed and sealed this 23rd day of September, A. D. 1930.

M. J. Moore,
Acting Commissioner of Patents.

(Seal)